United States Patent
Kitamura et al.

[15] 3,682,001
[45] Aug. 8, 1972

[54] MAXIMUM ACCELERATION INDICATOR

[72] Inventors: Takuya Kitamura, Yokohama; Takashi Haruna, Yokosuka; Minoru Toyoda, Ohmiya, all of Japan

[73] Assignee: Nissan Motor Company Limited, Kanagawa-Ku, Yokohama, Japan

[22] Filed: July 29, 1970

[21] Appl. No.: 59,043

[52] U.S. Cl. ............................................... 73/492
[51] Int. Cl. .............................................. G01p 15/04
[58] Field of Search ............... 73/492, 489, 514, 12; 116/114 AH; 200/61.45 M

[56] References Cited

UNITED STATES PATENTS

| | | | |
|---|---|---|---|
| 1,842,384 | 1/1932 | Blanchard | 73/492 |
| 3,167,965 | 2/1965 | Peterson | 73/492 |
| 2,744,976 | 5/1956 | Black | 200/61.45 M |
| 2,791,653 | 5/1957 | Haberland | 200/61.45 M |
| 3,389,606 | 6/1968 | Watson | 73/492 |
| 3,412,616 | 11/1968 | Watson | 73/492 |

FOREIGN PATENTS OR APPLICATIONS

| | | | |
|---|---|---|---|
| 1,066,586 | 1/1954 | France | 116/114 AH |

Primary Examiner—James J. Gill
Attorney—McCarthy, Depaoli, O'Brien and Price

[57] ABSTRACT

A maximum acceleration indicator having a plurality of steel balls which are retained by a magnet or magnets and which are forced, when subjected to a sudden and violent acceleration or deceleration, to depart from the magnet or magnets selectively independence upon the magnitude of the acceleration or deceleration, the indicator being advantageous for use with a motor vehicle for the purpose of quantitatively registering the maximum acceleration imparted thereto in the event a collision is encountered by the motor vehicle.

7 Claims, 16 Drawing Figures

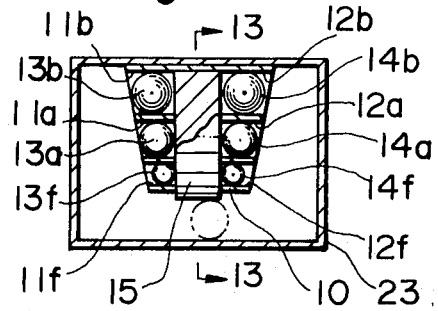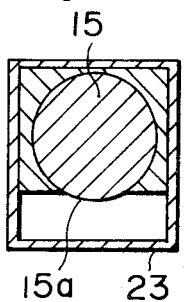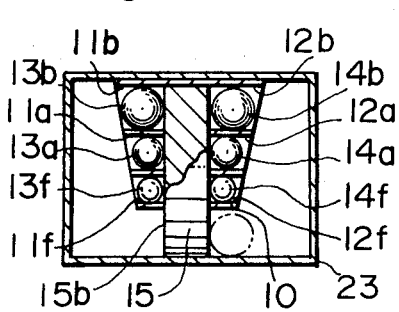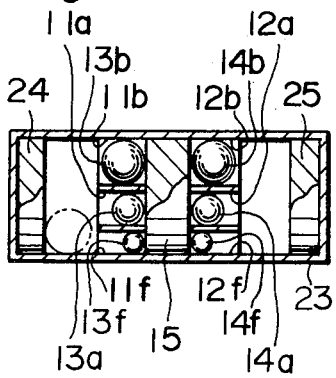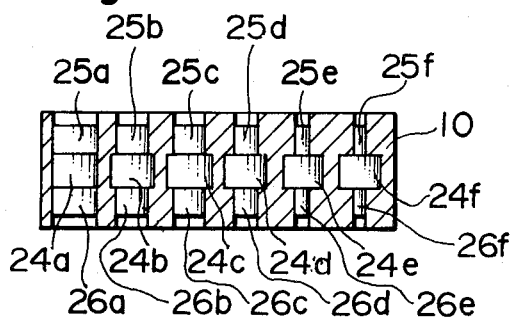

MAXIMUM ACCELERATION INDICATOR

This invention relates to a maximum acceleration indicator to be mounted on an object which moves at varying speeds. A typical example of such moving object is a motor vehicle and, where the maximum acceleration indicator is mounted on a motor vehicle, it will prove advantageous for the purpose of detecting and registering the acceleration at which the motor vehicle has encountered a collision.

Measuring and registering a maximum acceleration of a motor vehicle which has encountered a collision is important in the analysis and preparation of statistics of traffic accidents that are on the increase in number. In one previously proposed device for indicating a maximum acceleration of a moving member such as motor vehicle, a combination of a needle and a thin paper or metal foil is used whereby, when an acceleration greater than a predetermined magnitude is applied to the needle, the needle is moved to pierce the paper or metal foil at its pointed tip. Such known practice is, however, not adapted for the purpose of accurately quantitatively registering the maximum acceleration although an approximate magnitude of the maximum acceleration can be estimated.

An object of the invention is therefore to provide an improved maximum acceleration indicator which is adapted for accurately indicating and registering a maximum acceleration of a moving object.

Another object is to provide a maximum acceleration indicator whereby a maximum acceleration of a moving object such as motor vehicle can be registered quantitatively.

Still another object of the invention is to provide a maximum acceleration indicator which is so compact in construction as to be snugly mounted almost anywhere in a motor vehicle.

Still another object is to provide a maximum acceleration indicator which is easy and economical to manufacture. This is important because the indicator, which in itself is not needed for the operation of a motor vehicle, can be installed in the motor vehicle without significant expenses to be imposed on the owner of the motor vehicle.

Still another object is to provide a maximum acceleration indicator which need not be replaced with a new one after the indicator has once operated.

In order to accomplish these objects, the invention proposes to provide a maximum acceleration indicator which comprises a housing structure made of a non-magnetic material and having formed in its front and rear walls a plurality of open holes, a plurality of magneto-sensitive means which may be steel ball or disc members and which are different in weight from one another and accommodated in the open holes and a magnetic member or members mounted in the housing structure and retaining the steel balls in the open halls. With the maximum acceleration indicator thus constructed, one or two or more of the steel members which are retained in the open halls by means of the magnetic member or members are hurled out of the holes when an acceleration greater than a predetermined magnitude is imparted to the indicator. The balls being mounted on the front and rear walls of the housing structure, the indicator is adapted to detect and register an acceleration transferred thereto in two opposite directions.

Other objects, features and advantages of the maximum acceleration indicator according to the invention will become apparent from the following description taken in conjunction with the accompanying drawings, in which:

FIG. 12 is a sectional view of a modified form of the maximum acceleration indicator;

FIG. 13 is a section on line 13—13 of FIG. 12; and

FIGS. 14 to 16 are sectional views of further modified forms of the maximum acceleration indicator.

Figure 1:
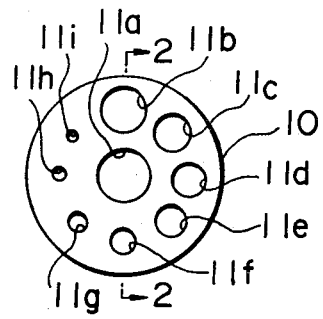
FIG. 1 is a front view of a preferred embodiment of the maximum acceleration indicator according to the invention.
Figure 2:
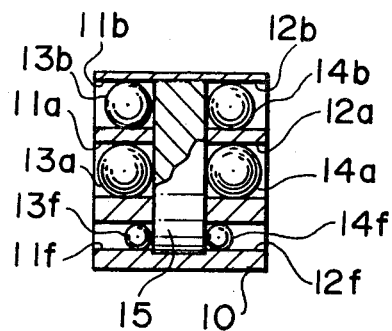
FIG. 2 is a section on line 2—2 of FIG. 1.

Referring first to FIGS. 1 and 2, the maximum acceleration indicator according to one embodiment of the invention includes a housing structure which is generally represented by reference numeral 10. The housing structure 10 is herein shown as generally cylindrical. A series 11 of open holes 11a to 11i and another series 12 of open holes 12a to 12i are formed on the front and rear walls, respectively, of the housing structure 10. The sizes and the positions relative to the center of the housing structure of the open holes 11a to 11i and 12a to 12i are different from one another. The number of the holes may be selected freely depending upon the desired accuracy of the measurement of the maximum acceleration, although they are shown as nine in number on each side of the housing structure.

A series 13 of balls 13a to 13i and another series 14 of balls 14a to 14i which are made of a material sensitive to magnetism, such as steel, are mounted in the open holes 11a to 11i, and 12a to 12i, respectively, as illustrated in FIG. 2. The balls 13a to 13i and 14a to 14i are attracted by and normally attached to a common magnetic member 15 which is between the series 11 and 12 of the open holes, the magnetic member 15 thus acting as a retainer of the balls and at the same time forming the bottom wall of each of the open holes. The balls 13a to 13i are different in diameter from one another and the balls 14a to 14i are also different in diameter from one another. The balls 13a to 13i may, however, be equal in diameter to the corresponding ones of the balls 14a and 14i, in which instance the holes 11a to 11i and 12a to 12i may be configured accordingly.

Figure 3:
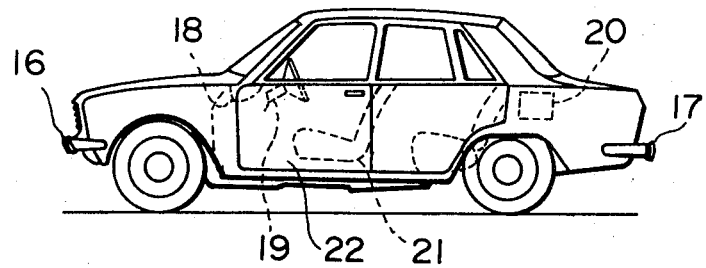
FIG. 3 is a schematical view of a motor vehicle on which the maximum acceleration indicator according to the invention is to be mounted.

The maximum acceleration indicator thus constructed may be installed practically anywhere in a motor vehicle for its compact construction, say, on the front bumper 16, rear bumper 17, dashboard 18, steering 19, fuel tank 20, driver's seat 21 and/or floor or side seal 22, as illustrated in FIG. 3.

When, in operation, a moving object such as motor vehicle on which the maximum acceleration indicator is mounted is subjected to a sudden and violent deceration in the forward direction or acceleration in the reverse direction as a result of a collision taking place on the front or rear side of the moving object, then either the series 13 of steel balls 13a to 13i or the series 14 of steel balls 14a to 14i, which have been retained in the respective open holes, are subjected to forces that urge the balls outwardly of the open holes against the influence of the magnetism built up by the magnetic member 15. The forces to cause the steel balls 13a to 13i or 14a to 14i to depart from the magnetic member 15 depend upon the weights and therefore the diameters of the individual balls so that only those balls which are subjected to forces greater than the force resulting form the magnetism of the magnetic member 15 are hurled out of the open holes in which they have been retained.

The magnitude of the maximum acceleration exerted to the indicator in the event of such sudden and violent deceleration in the forward direction or acceleration in the reverse direction of the moving object such as motor vehicle will be quantitatively known by checking the balls that have been thrown out from the indicator housing structure 10.

The magnetic member 15 may preferably be made of a ferrite magnet because of its prolonged resistance to aging, heat and mechanical stress. Where a ferrite magnet is used as the magnetic member 15, the magnetic member may be so shaped that the thickness (indicated by $t$ in FIG. 2) is relatively small as compared with the area of the front or rear face thereof. Experiments have revealed that, where a disc-shaped magnetic member is used, the ratio of the diameter vs. thickness should be 2:1 or 3:2. The distribution of the magnetic flux density of the pole-face, in this instance, will be known by measuring the acceleration at which steel balls of the same diameter are forced to depart from the different relative positions of the magnetic member, as will be observed from FIG. 4.

Figure 4:
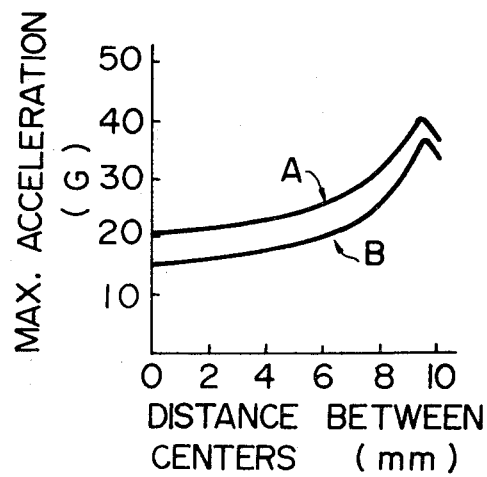
FIG. 4 is a graphical representation of a relationship between the positions of the steel balls relative to the magnetic member and the accelerations at which the balls are forced to depart from the magnetic member.

FIG. 4 illustrates results of a test in which steel balls of a 4 mm diameter positioned at different distances from the center of a magnetic member of a 20 mm diameter are subjected to a sudden and violent deceleration. In FIG. 2, the curve A indicates the case where the thickness $t$ of the magnetic member is 15 mm, while the curve B indicates the case with the magnetic member of a 10 mm thickness.

Figure 5:
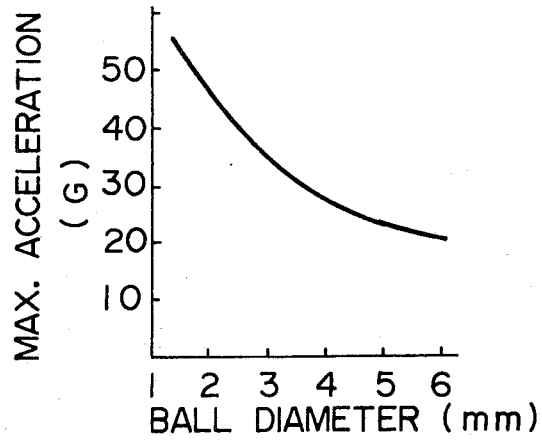
FIG. 5 is a graphical representation of a relationship between the sizes of the balls and the accelerations at which the balls are forced to depart from the magnetic member.

As previously noted, the forces required to cause the balls to depart from the magnetic member vary with the diameters of the individual balls. This will be clearly understood through observation of FIG. 5 which illustrates the relationship of the diameters of the steel balls and the accelerations at which the balls, positioned at the same distance from the center of the magnetic member, are caused to depart from the magnetic member, wherein the balls are positioned at 6.5 mm from the center of the magnetic member which is sized to be 20 mm in diameter and 15 mm in thickness.

The relationship between the sizes and relative positions of the steel balls and the acceleration at which the balls are hurled from the magnetic member will be better understood when reference is made to FIGS. 6 and 7 in the following tables.

Table 1

Figure 6:
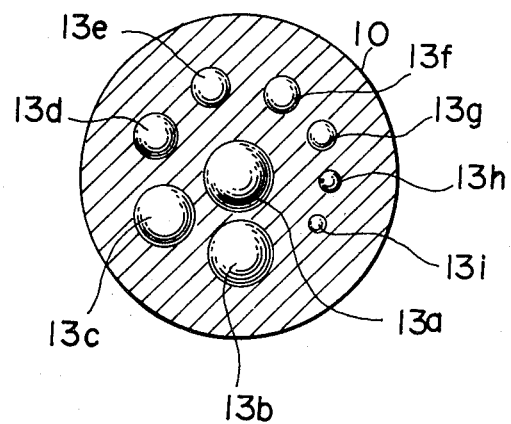
FIGS. 6 and 7 are front views of maximum acceleration indicators having different hole and ball configurations.

Ball Configuration of FIG. 6

| denotation of balls | ball diam., (mm) | distance between centers (mm) | Maximum acceleration |
|---|---|---|---|
| 13a | 6.3 | 0 | 10G |
| 13b | 5.2 | 6.5 | 15G |
| 13c | 5.2 | 7.5 | 20G |
| 13d | 4.2 | | 25G |
| 13e | 3.2 | | 30G |
| 13f | 2.7 | | 35G |
| 13g | 2.2 | 8.0 | 40G |
| 13h | 1.7 | | 45G |
| 13i | 1.2 | | 50G |

Table 2

Figure 7:
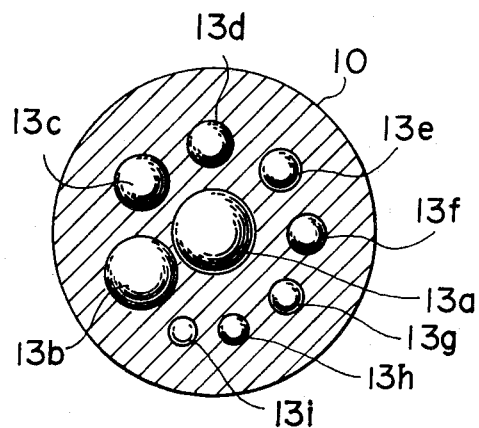

Ball Configuration of FIG. 7

| denotation of balls | ball diam., (mm) | distance between centers (mm) | maximum acceleration |
|---|---|---|---|
| 13a | 7.2 | 0 | 10G |
| 13b | 6.2 | 7.0 | 15G |
| 13c | 5.2 | 7.5 | 20G |
| 13d | 4.2 | 7.5 | 25G |
| 13e | 3.2 | 8.0 | 30G |
| 13f | 3.2 | 8.2 | 35G |
| 13g | 3.2 | 8.5 | 40G |
| 13h | 2.7 | 8.5 | 45G |
| 13i | 2.7 | 8.8 | 50G |

Figure 8:
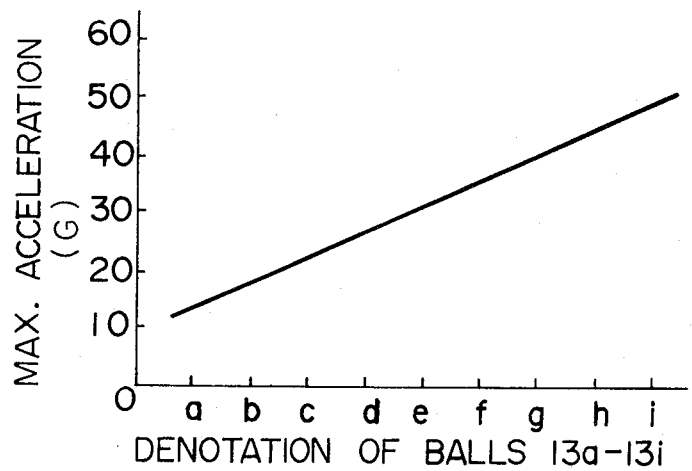
FIGS. 8 and 9 are plots indicating the operations of the indicators shown in FIGS. 6 and 7, respectively.
Figure 9:
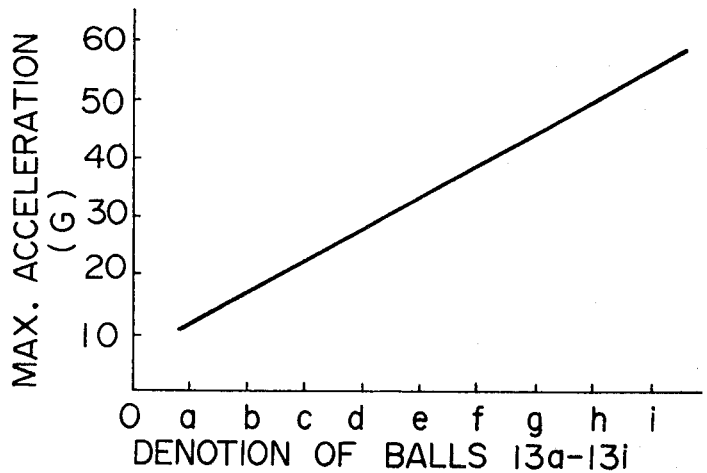

The maximum accelerations at which the balls configured as illustrated in FIGS. 6 and 7 are shown in FIGS. 8 and 9, respectively. By observation of FIGS. 8 and 9, it will be appreciated that, since an acceleration that develops in the event a collision is encountered by a motor vehicle is usually of the order of 50G, the maximum acceleration indicator which has been shown and described sufficiently lends itself to the purpose of quantitatively registering the maximum acceleration.

Figure 10:
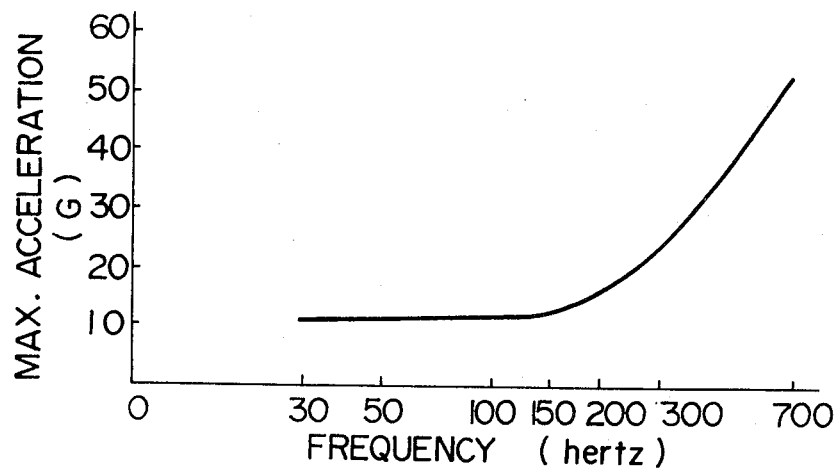
FIGS. 10 and 11 are graphical representations of a relationships of the frequencies in hertz of accelerations and the maximum accelerations at which the steel balls of the indicators shown in FIGS. 6 and 7, respectively, are forced to depart from the magnetic member.
Figure 11:
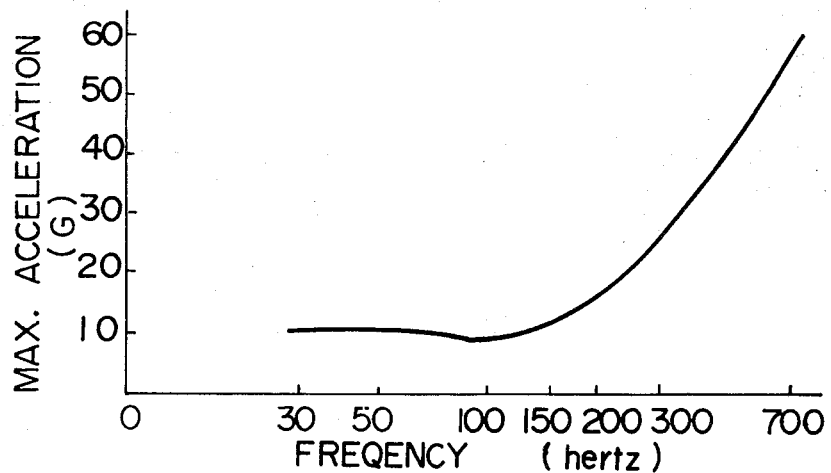

FIGS. 10 and 11 illustrates relationships between the frequencies in hertz of accelerations (i.e. the reciprocals of the durations of accelerations) of balls hurled at 10G in the ball configurations of FIGS. 6 and 7, respectively, and the accelerations at which the balls are caused to depart from the magnetic members. As illustrated, in accordance as the frequency of acceleration increases, i.e., as the duration of the acceleration becomes shorter, the acceleration at which the ball is caused to depart from the magnetic member increases but, when the frequency is lower than about 100 hertz, the acceleration is substantially kept at a constant level of about 10G. Since, in this instance, the duration of an acceleration in a collision encountered by a motor vehicle is usually within a range corresponding to 30 to 50 hertz frequency, and since the acceleration in this particular frequency range is substantially kept constant, the maximum acceleration can be detected and registered sufficiently accurately in a quantitative fashion. Here, it may be noted that, where a usual accelerometer using a spring and a weight, the spring should be provided with 200 hertz or higher characteristic frequency so as to detect and register an acceleration with 30 to 50 hertz frequency. In such spring-and-weight type accelerometer, however, the weight is permitted to move only about 0.06 mm when an acceleration of the order of 10G is imparted to the weight, making it practically impossible or at least meaningless to register the acceleration with 30 to 50 hertz frequency as encountered in a collision of a motor vehicle. Such a drawback experienced in the spring-and-weight type accelerometer is advantageously eliminated in the maximum acceleration indicator according to the invention, as will be appreciated with reference to FIGS. 10 and 11.

FIGS. 12 and 13 illustrate a modified form of the maximum acceleration indicator according to the invention. As illustrated, the maximum acceleration indicator comprises, in addition to those elements which are shown in FIGS. 1 and 2 and which are as such designated by the same reference numerals, a transparent, non-magnetic casing 23 in which the housing structure 10 is fixedly accommodated. The casing 23 has an internal space that is enough to receive therein balls which are forced out of the open holes when a sudden and violent acceleration or deceleration is encountered. As clearly seen in FIG. 13, a portion 15a of the magnetic member 15 may be protruded from the housing structure 10 whereby the balls hurled out of the open holes are attached to the protruded or exposed portion 15a. In order that the balls hurled out of the open holes be securely attached to the magnetic member 15 within the casing 23, the protruded portion of the magnetic member 15 may be increased as at 15b in FIG. 14. For the same purpose, there may be mounted two additional magnetic members 24 and 25 which are positioned relative to the series 11 of open holes 11a to 11i and the series 12 of open holes 12a and 12i, respectively, as shown in FIG. 15.

If further preferred, a plurality of different magnetic members, as designated by reference numerals 24a to 24f in FIG. 16, may be used in lieu of a single magnetic member 15, the magnetic members being allocated to the pairs of the magneto-sensitive means positioned on both sides thereof. In FIG. 16, the magneto-sensitive means are shown as disc or cylindrical members which are now denoted by reference numerals 25a to 25f and 26a to 26f.

What is claimed is:

1. A maximum acceleration indicator comprising a housing structure which is made of a non-magnetic material and which has in its front and rear walls a plurality of open holes, a plurality of magneto-sensitive means which are different in weight from one another and which are accommodated in said open holes, and a single magnetic member mounted between said front and rear walls of said housing structure to retain said magneto-sensitive means in said open holes.

2. An indicator according to claim 1, wherein said magnetic member is made of a ferrite magnet.

3. An indicator according to claim 1, wherein said magneto-sensitive means are steel balls which are different in diameter from one another.

4. An indicator according to claim 1, wherein said magneto-sensitive means are cylindrical members of steel.

5. An indicator according to claim 1, further comprising a transparent casing which is made of a transparent, non-magnetic material and in which said housing structure is fixedly accommodated, said casing having an internal space which is enough to receive therein the balls which are hurled from said holes.

6. An indicator according to claim 5, wherein said magnetic member has its portion protruded outwardly of said housing structure.

7. An indicator according to claim 5, further comprising two additional magnetic members which are positioned relative to said open holes in said front and rear walls of said structure.

* * * * *